United States Patent Office 2,847,416
Patented Aug. 12, 1958

2,847,416

N-[1-(5-NITRO-2-FURYL) ETHYLIDENE]-3-AMINO-2-OXAZOLIDONE

Gabriel Gever, Oxford, N. Y., assignor, by mesne assignments, to The Norwich Pharmacal Company, Norwich, N. Y., a corporation of New York No Drawing. Original application February 28, 1952, Serial No. 274,066, now Patent No. 2,742,462, dated April 17, 1956. Divided and this application February 15, 1956, Serial No. 565,534

1 Claim. (Cl. 260—307)

This invention relates to a new chemical compound which exhibits a high order of in vivo chemotherapeutic effectiveness against microbial infections upon oral administration and which is well tolerated by the host when so administered. My new compound is N-[1-(5-nitro-2-furyl)ethylidene]-3-amino-2-oxazolidone, described by the following formula:

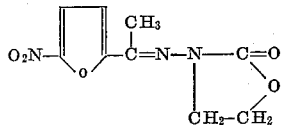

It is known that nitrofurans as a class possess antibacterial activity. Those antibacterial nitrofurans may be placed in two groups: (1) compounds whose use has been limited to local administration; and (2) compounds which also exhibit chemotherapeutic activity upon oral administration. In the past, the compounds in the second group have possessed an objectionable characteristic in that, when administered in sufficient quantity to serve as effective chemotherapeutic agents, they have frequently caused nausea and vomiting. This has imposed a distinct limitation upon the use of such compounds.

I have made the surprising discovery that N-[1-(5-nitro-2-furyl)ethylidene]-3-amino-2-oxazolidone, while possessing the high order of antibacterial activity of past nitrofurans and the chemotherapeutic effectiveness that characterizes the group of past nitrofurans which could be administered orally, differs markedly therefrom in that it is remarkably free from the untoward and unwanted effects of nausea and vomiting when administered orally in amount sufficient to afford protection of a high order. Its use is not attended by the danger that the recipient of a drug made therefrom may be unable to retain it and allow it to perform its desired therapeutic function.

My new compound has proved, in the treatment of animals lethally infected with pathogenic organisms, to be possessed of curative properties of an astonishingly high order: Protection of a very high order is afforded, post infection, to animals lethally infected with *S. typhosa* and *V. comma*. Salmonella is the causative agent of typhoid fever for which no truly successful chemotherapeutic agent has yet emerged. The *V. comma* bacillus is the causative agent of cholera, a disease of epidemic proportions in some countries. The dosage, per os, necessary to obtain a high order of chemotherapeutic protection in animals lethally infected with these organisms is most tolerable and provokes no manifestation of toxic response. The high therapeutic index of my new compound permits dosages to be well spaced at time intervals in keeping with accepted modes of therapy—an initial dose being followed by further doses at determined intervals.

The formulation of my new compound in a manner which will permit oral administration thereof is easy. The compound may be incorporated in tablets or lozenges. Such tablets are compounded in conventional fashion by granulating the compound with standard starch paste, drying, adding dry starch and pressing out the tablets. The lozenges are compounded in conventional fashion also, by granulating with sugar syrup and then adding bulk in the form of powdered sugar and dry starch, and a flavoring material.

My new compound can be readily prepared by causing methyl 5-nitro-2-furyl ketone to react with 3-amino-2-oxazolidone (which compound can be obtained according to procedure described in U. S. Patent No. 2,652,402). In order that my invention may be entirely available to those skilled in the art, a method of making my new compound is described briefly:

EXAMPLE

*N-[1-(5-nitro-2-furyl)ethylidene]-3-amino-2-oxazolidone*

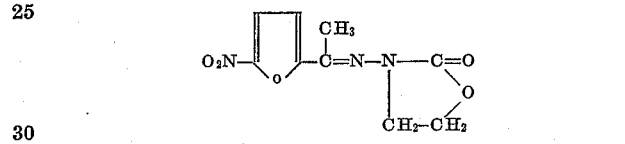

3-amino-2-oxazolidone is prepared by adding a solution of 1.8 g. of sodium in 25 cc. of anhydrous methanol to a mixture of 46 g. of 2-hydroxyethyl hydrazine and 90 cc. of diethyl carbonate. The mixture is heated and the ethanol formed in the reaction slowly distilled. When the distillation of ethanol ceases, the residue is cooled and diluted with 10 cc. of ethanol. The resulting precipitate of 3-amino-2-oxazolidone is filtered off and dried and is then recrystallized from ethanol.

To a solution of 7.8 g. of methyl 5-nitro-2-furyl ketone in 75 cc. of 30% (by volume) boiling acetic acid is added 5 g. of 3-amino-2-oxazolidone, prepared as described above. The solution is refluxed for seven minutes, cooled and the resulting crystals removed by filtration. The solid is washed with water, then with alcohol, and dried. The yield of N-[1-(5-nitro-2-furyl)ethylidene]-3-amino-2-oxazolidone is 8.9 g., 76%, M. P. 125–128° C. Recrystallization from absolute alcohol raises the melting point to 132.5–133° C.

This application is a division of my copending application, Serial No. 274,066, filed February 28, 1952, now Patent No. 2,742,462.

What I claim is:

N - [1 - (5 - nitro - 2 - furyl)ethylidene] - 3 - amino - 2-oxazolidone represented by the formula:

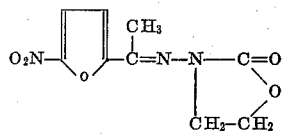

References Cited in the file of this patent

UNITED STATES PATENTS 2,742,462    Gever   ------------------  Apr. 17, 1956